United States Patent [19]

Wood et al.

[11] Patent Number: 4,785,470

[45] Date of Patent: Nov. 15, 1988

[54] REFLECTIVITY AND RESOLUTION X-RAY DISPERSIVE AND REFLECTIVE STRUCTURES FOR CARBON, BERYLLIUM AND BORON ANALYSIS

[75] Inventors: James L. Wood, Westland; Keith L. Hart, Flat Rock, both of Mich.

[73] Assignee: Ovonic Synthetic Materials Company, Inc., Troy, Mich.

[21] Appl. No.: 856,685

[22] Filed: Apr. 25, 1986

Related U.S. Application Data

[63] Continuation-in-part of Ser. No. 547,338, Oct. 31, 1983, Pat. No. 4,693,933, which is a continuation-in-part of Ser. No. 501,659, Jun. 6, 1983, abandoned.

[51] Int. Cl.$^4$ .............................................. G21K 1/06
[52] U.S. Cl. ........................................ 378/84; 378/45; 378/49; 427/160; 428/698; 428/704; 428/627
[58] Field of Search ................. 378/44, 45, 49, 82, 378/84; 350/1.6, 1.7, 166, 397; 428/620, 627, 641, 333, 433–434, 688, 698–699, 704, 913; 427/160, 404

[56] References Cited

U.S. PATENT DOCUMENTS

| | | | |
|---|---|---|---|
| 3,682,528 | 8/1972 | Apfel et al. ........................ | 350/166 |
| 3,885,153 | 5/1975 | Schoenberg et al. ............... | 350/166 |
| 3,887,261 | 6/1973 | Spiller ................................ | 350/1 |
| 3,895,156 | 7/1975 | Hammond .......................... | 428/688 |
| 4,091,282 | 5/1978 | Anisovich et al. ................. | 378/45 |
| 4,101,200 | 7/1978 | Daxinger ............................ | 350/166 |
| 4,203,034 | 5/1980 | Carroll, Jr. ......................... | 378/84 |
| 4,238,529 | 12/1980 | Sicignano et al. ................. | 427/160 |
| 4,261,771 | 4/1981 | Dingle et al. ...................... | 357/16 |
| 4,495,254 | 1/1985 | Hoffman ............................ | 428/333 |
| 4,525,853 | 6/1985 | Keem et al. ........................ | 378/84 |
| 4,619,865 | 10/1986 | Keem et al. ........................ | 428/333 |

FOREIGN PATENT DOCUMENTS 0128026 12/1984 European Pat. Off. ............. 378/82

OTHER PUBLICATIONS

"New Class of Layered Materials" by Schuller Phys Rev. Letters, vol. 44, #24, Jun. 16, 1986.
"Evaporated Multilayer Dispersion Elements for Soft X-Rays", by Spiller, AIP, 1981.
"Layered Synthetic Microstructures . . ." by Underwood et al., SPIE, vol. 184, Space Optics–Imaging X-Ray Optics Workshop, 1979.
"Controlled Fabrication of Multilayer Soft-X-Ray Mirrors" by Spiller et al., Applied Phys. Letter.
"Synthetic Multilayers as Brass Diffractors . . ." by Underwood et al., Amer. Inst of Physics, 1981.
"The Renaissance of X-Ray Optics" by Underwood et al., Physics Today, Apr. 1984.
"Layered Synthetic Microstructures as Brass Diffractors . . ." by Underwood et al., Applied Optics, vol. 20, #17, 9/1/81.

*Primary Examiner*—Craig E. Church
*Assistant Examiner*—John C. Freeman
*Attorney, Agent, or Firm*—Richard M. Goldman; Marvin S. Siskind

[57] ABSTRACT

X-ray dispersive and reflective structures and materials are constructed which exhibit improved characteristics in specific ranges of interest. The structures are formed of metallic and non-metallic layer pairs. The structures are formed of alternating layers of Cr:C, Ni:C or V:C for carbon analysis and Mo:B$_4$C for beryllium an boron analysis. The layered structures can be formed from Ni:C for analysis of both carbon and boron.

2 Claims, 5 Drawing Sheets

PRIOR ART

REFLECTIVITY AND RESOLUTION X-RAY DISPERSIVE AND REFLECTIVE STRUCTURES FOR CARBON, BERYLLIUM AND BORON ANALYSIS

CROSS REFERENCE TO RELATED APPLICATIONS

This application is a continuation-n-part of U.S. Ser. No. 547,338, filed Oct. 31, 1983, now U.S. Pat. No. 4,693,933 entitled "Improved Reflectivity And Resolution X-Ray Dispersive And Reflective Structures And Method Of Making The Structures" which is a continuation-in-part of U.S. Ser. No. 501,659, filed June 6, 1983, abandoned June 18, 1986 entitled "Improved X-ray Dispersive And Reflective Structures And Method Of Making The Structures".

BACKGROUND OF THE INVENTION

This invention relates to improved reflectivity and resolution X-ray dispersive and reflective structures for carbon, beryllium and boron analysis. These synthetic structures are free from the constraints of crystalline symmetries and from the restrictive prior art vapor deposition techniques and materials. The improved structures provide improved characteristics for the specific analysis designed for.

Commercial X-ray dispersive structures are formed from crystalline structures such as LiF, metal acid phthalates (map), pyrolytic graphite and Langmuir-Blodgett (LB) films. These materials have very restrictive lattice spacing constraints. In addition, the LB and map devices have severe environmental limitations and must be operated near room temperature in a dry environment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo or hetero epitaxially grown planes or film layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal synthetic material with good crystalline quality and long range order. The thickness of each layer pair (A and B) is defined as the "d" spacing. These structures are not appropriate for most reflective or dispersive structures due to the small electron density contrast between the layers. These structures being essentially single crystals with extra super lattice periodicities also suffer from restrictive d spacing, associated with the constraint that the entire structure be a single crystal.

In addition to the MBE type of superlattices construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing through the structure.

These materials can be thought of as synthetic crystals or crystal analogues in which it is defined as crucial that the long range periodicity or repetition of a particular combination of layers be maintained. These structures are both structurally and chemically homogeneous in the x-y plane, and are periodic in the third (z) direction. These construction approaches particularly sputtering, can utilize a greater variety of materials than evaporation.

SUMMARY OF THE INVENTION

The disadvantages of the prior art are overcome by improved reflectivity and resolution X-ray dispersive and reflective structures and materials. The structures exhibit enhanced characteristics in specific soft X-ray wavelength ranges for carbon, beryllium and boron analysis. The structures include alternating layers of metallic and non-metallic materials. The alternating layers are formed of Cr:C, Ni:C or V:C for carbon analysis and Mo:$B_4C$ for beryllium and boron analysis. The layered structures can be formed from Ni:C for analysis of both carbon and boron.

DESCRIPTION OF THE PREFERRED EMBODIMENTS

FIGS. 1 through 8 describe the prior art and the system, materials and structure described and claimed in the parent application, U.S. Ser. No. 501,659. The applicability of the parent disclosure to the present invention is described therewith and the new materials and structures of the present invention are described with respect to the Tables and text thereafter.

Figure 1:
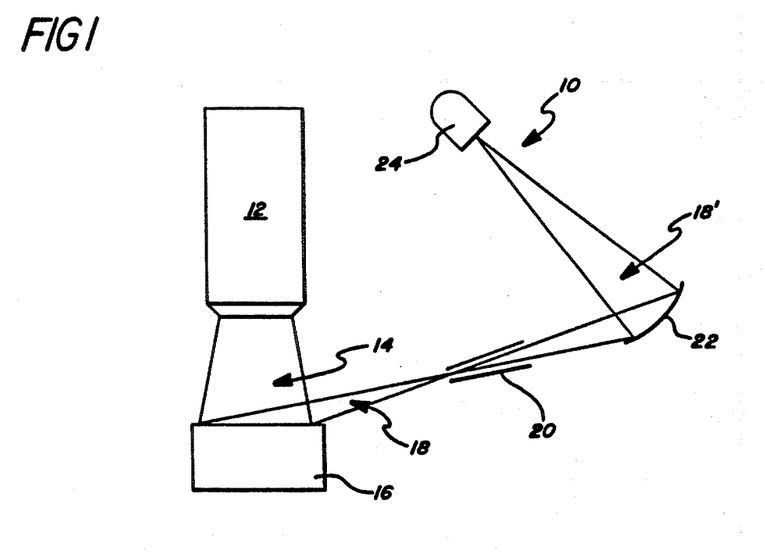
FIG. 1 is a partial diagrammatic representation of one embodiment of X-ray analysis system which can utilize the X-ray dispersive structures of the invention.

Referring to FIG. 1, there is shown a diagrammatical representation of a conventional X-ray analysis system 10. The system 10 includes an X-ray source 12 which directs a beam of X-rays 14 at a sample 16. A beam 18 of fluorescent radiation is emitted by the sample 16 which is aligned to pass through an aperture 20 onto an X-ray dispersive structure 22 which reflects a beam 18' to a detector 24. The curvature of the structure 22 is exaggerated, but it is slightly curved to focus the desired wavelengths of the reflected beam 18' onto the detector 24.

Figure 2:
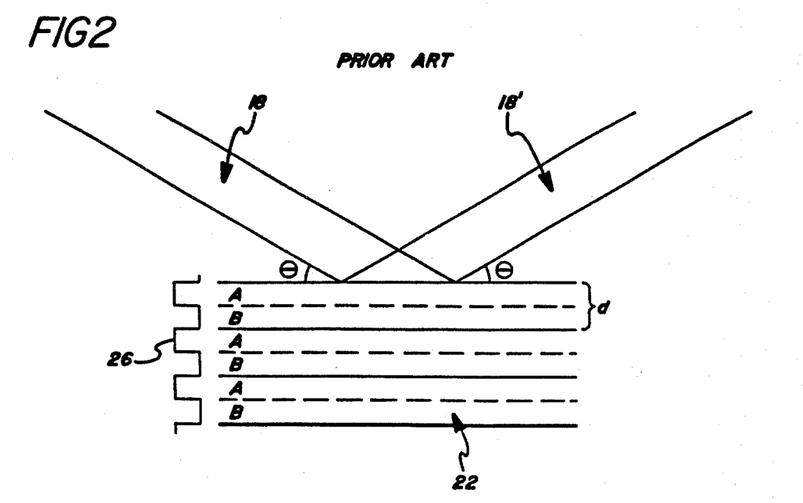
FIG. 2 is an exploded partial sectional view of a prior art X-ray dispersive structure illustrating the X-ray dispersive pattern.

FIG. 2 shows the dispersion pattern of a typical prior art layered structure 22. While only three layer pairs have been shown, having a layer spacing d, typically many layer pairs are utilized for example on the order of 100–2000. The incident beam 18 is made up of a band of wavelengths, $\lambda$ being an example of one wavelength. The reflected beam 18' is made up of a substantially single wavelength $\lambda$ reflected at angle $\theta$, approximately according to Bragg's law $n\lambda' = 2d \sin \theta$. This condition is also satisfied for all subharmonics of $\lambda'$, i.e. $\lambda'/2$, $\lambda'/3$ ... $\lambda'/n$. Therefore, the reflected beam 18' contains all of these wavelengths in proportion to both their intensity in the incident beam and the magnitude of the higher orders of reflection which result from the rectangular electron density distribution, as illustrated in FIG. 2. $I_i(\lambda)$ is the incident intensity distribution of $\lambda$ and $I_r(\lambda')$ is the reflected intensity distribution of $\lambda'$. (A full theoretical treatment results in a modification of Bragg's law resulting from refraction of the X-ray beam.)

Each layer pair contributes to the reflected beam intensity at a like angle. The reflection from only one layer pair is illustrated. The structure 22 generally is curved to focus the reflected wavelength of interest from each layer pair onto the detector 24. The structure 22 is formed from a plurality of layers, each layer of which includes a pair of different material layers A and B which is intended to have an abrupt junction between each layer. Functionally, this means there essentially is a square wave density or reflection index 26 which intercepts the beam 18.

Figure 3:
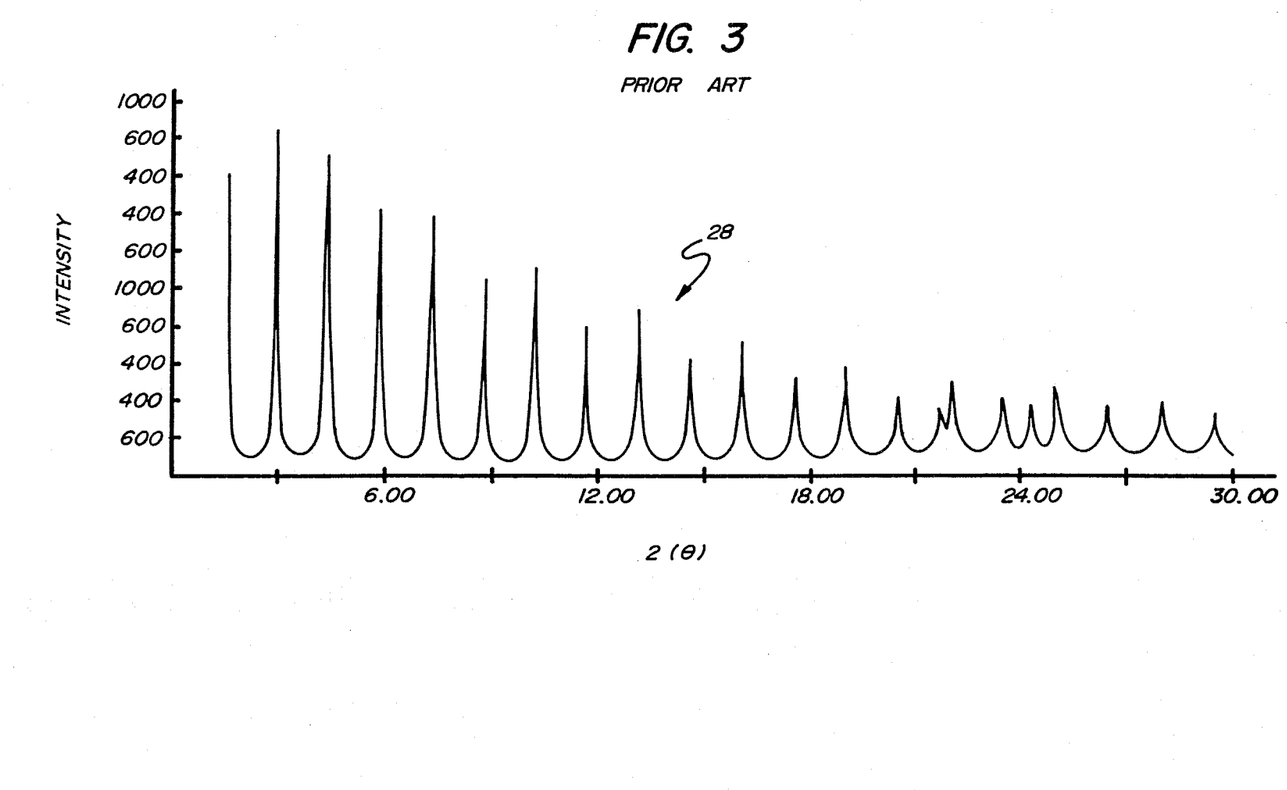
FIG. 3 is a diffraction pattern generated by the prior art structure of FIG. 2.

FIG. 3 illustrates a diffraction pattern 28 caused by the incident beam 18 impinging on a prior art LB X-ray dispersive structure. Each of the peaks is an order of reflection, n, for the wavelength $\lambda'$ (the wavelength of interest) as derived according to the approximate relationship $n\lambda' = 2d \sin \theta_n$. The prior art 1 sm devices exhibit similar diffraction patterns, which essentially are controlled by the materials deposited and the d spacings utilized.

Figure 4:
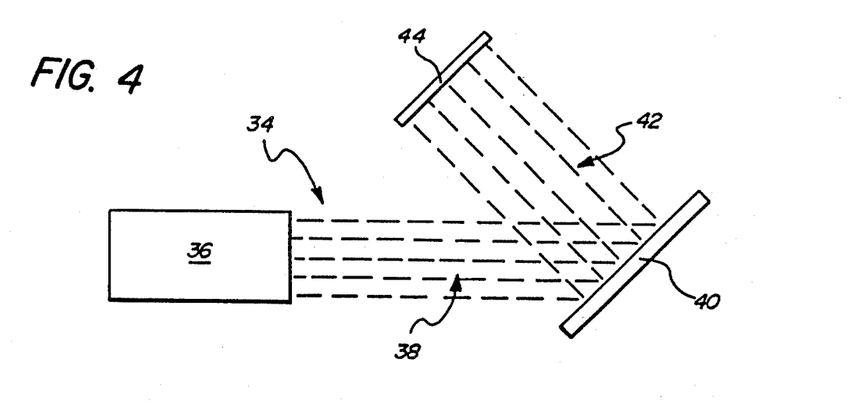
FIG. 4 is a partial side view diagrammatical representation of one embodiment of ion beam deposition technique which can be utilized in forming the structures of the invention.

The deposition parameters can be controlled by depositing the materials in an ion beam system to accurately control the deposition of the layers throughout the structure. One embodiment of a suitable ion beam system 34 is illustrated in FIGS. 4 and 5.

Ion beam techniques have not been utilized to deposit prior X-ray dispersive and reflective structures, but the techniques as adapted by the parent applications are desirable due to their precision and control of the deposition parameters as well as the decoupling of the ion plasma from the substrate and minimization of undesirable components in depositing the desired structure. An ion source 36 generates a beam of ions 38 which are neutralized and directed at a suitable target 40. The beam 38 sputters material from the target 40 into a substantially collimated and uniform stream 42 which is deposited on a suitable substrate 44. The substrate 44 can be mounted on a holder (not shown) and the system 34 is under vacuum which can be substantially lower than that utilized in magnetron or diode sputtering. The substrate 44 also can be heated or cooled as desired to affect the structure of the material deposited as described hereinafter.

Figure 5:
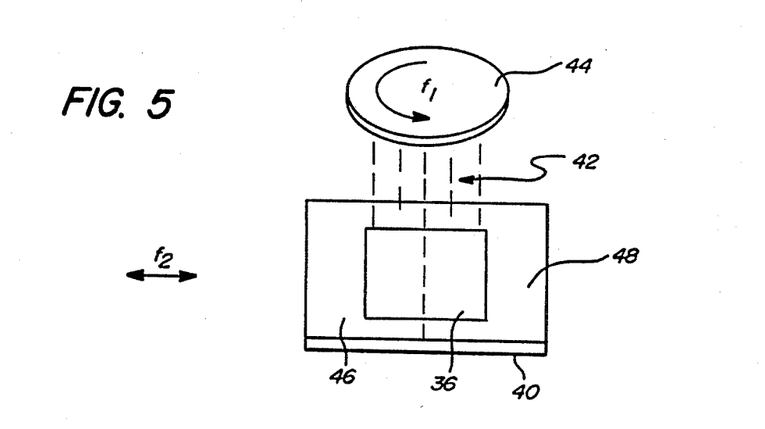
FIG. 5 is a partial end view diagrammatical representation of the technique of FIG. 4.

As best illustrated in FIG. 5, the ion source 36 preferably is a square cross section source which generates a substantially square section beam 38. The substrate 44 preferably is rotated at a frequency $f_1$, to ensure an even deposition across the substrate 44, preferably in the range of 10–20 rpm. The target 40 is divided into two sections 46 and 48, each formed from a different material, C and D as described above. To form the rectangular electron density structures, the source can be turned off while the target is translated or it can be shuttered to effect the complete separation of the material layers. As utilized herein, frequency is defined as a prescribed rate of repetitions of relative orientations and is not limited to sinusoidal repetitions.

The frequency $f_1$ preferably is much greater than the frequency $f_2$, for example on the order of 100 times $f_1$. For different materials and structures $f_1$ and $f_2$ will be different and section 46 might be passed in front of the beam 38 at a different rate or with a different beam power than section 48. Further, the sections 46 and 48 can be separate targets and there can be more than two sections, which also can be controlled by shutters (not shown) if desired. Single element materials, compounds, alloys or combinations thereof can be utilized to form the layers.

Figure 6:
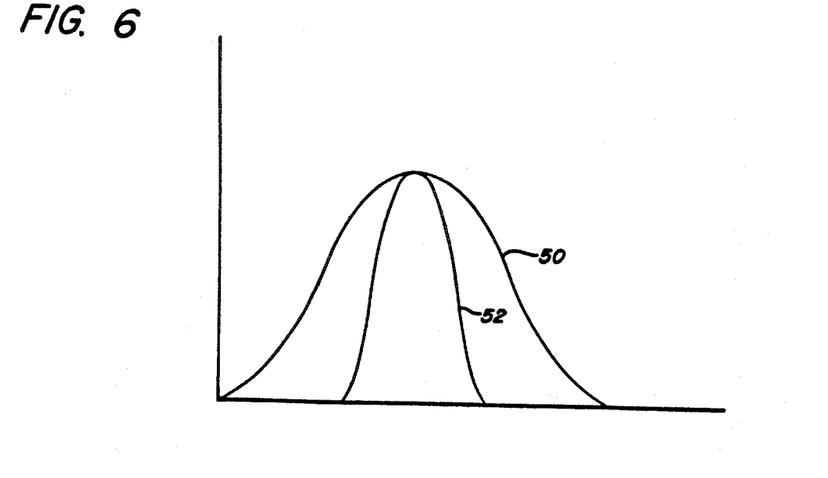
FIG. 6 is a diagram of reflected wavelength resolution.

FIG. 6 is a diagram illustrating the reflected wavelength resolution. The more narrow the bandwidth, the more resolution is obtained from the reflected signal, hence a reflected bandwidth 50 has much less resolution than the same reflected signal with a bandwidth 52. The precision of the system 34 can result in a much more narrow reflected bandwidth than the prior 1 sm type of X-ray structures 22.

Figure 7:
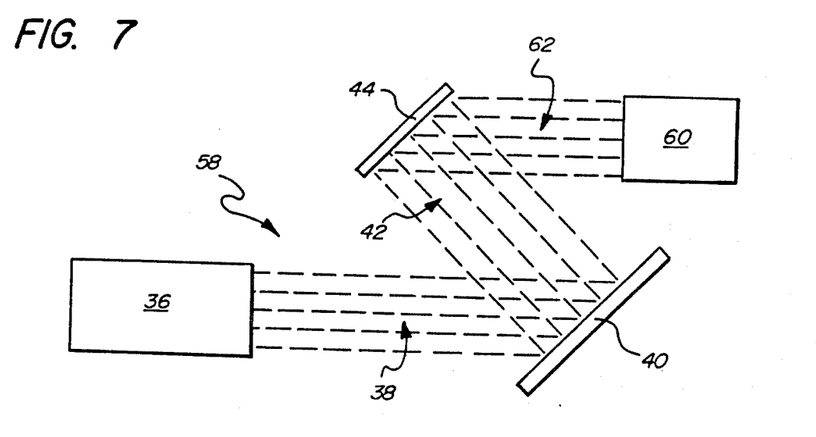
FIG. 7 is a partial diagrammatical representation of a second embodiment of the ion beam deposition technique which can be utilized in forming the structures of the invention.

FIG. 7 illustrates a second ion beam system 58, which can be identical to the system 34 with the addition of a second ion beam source 60. The ion beam source 60 generates an ion beam 62 which can be a reactive ion beam formed from argon and/or nitrogen or other suitable materials and combinations thereof. A reactive ion beam can be utilized to control the density of the materials in a selected layer or layers or in all layers. The substrate 44 is again rotated at a speed $f_1$ and the target 40 is oscillated in front of the beam 38 at a frequency $f_2$. The current of the reactive beam 62 can be controlled at a third frequency $f_3$ to modulate and assist in the deposition of the material onto the substrate 44. The ion current of the ion source 36 also can be varied at a fourth frequency $f_4$, to provide a further control of the deposition process. The ion beam source 60 also can be utilized to ion mill the substrate 44 prior to deposition of the layers by the ion source 36.

Figure 8:
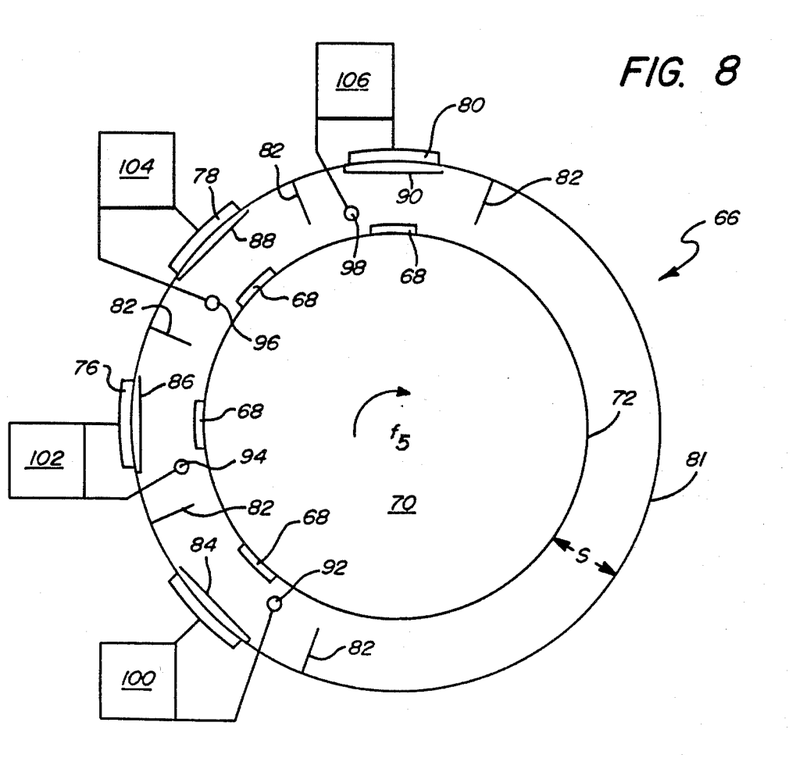
FIG. 8 is a partial diagrammatical representation of a third deposition technique which can be utilized in forming the structures of the invention.
Figure 9:
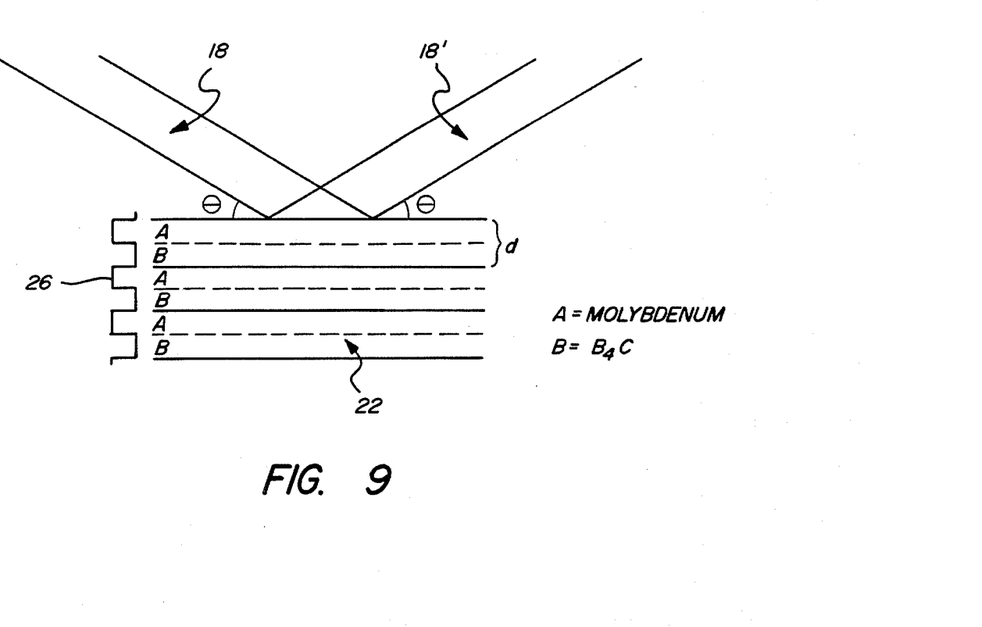
FIG. 9 and FIG. 10 are exploded sectional views of the x-ray dispersive structure of the invention.
Figure 10:
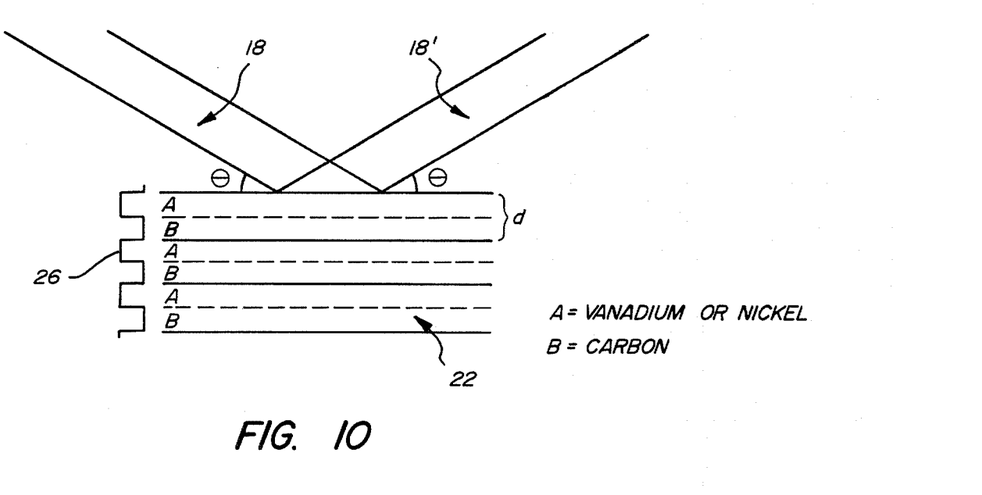

A third type of deposition system 66 is illustrated in FIG. 8. The system 66 is a magnetron sputtering deposition system which confines the plasma to the vicinity of a plurality of target 74, 76, 78 and 80 separated from a plurality of substrates 68 fixed to a rotating drum 70. The outer surface of the drum 70 also could be utilized as a substrate 72 if desired. The drum 70 can be heated or cooled as desired and is rotated at a frequency $f_5$ to pass the substrate 68 past a plurality of targets 74, 76, 78 and 80 mounted on a shell 81 of the system.

Each target 74, 76, 78 and 80 is isolated by a variable height isolation shield 82. Each target 74, 76, 78 and 80 has associated therewith a shutter 84, 86, 88 and 90, a deposition rate monitor 92, 94, 96 and 98 which is coupled to a respective power supply 100, 102, 104 and 106. Each target thus has its own power supply, shutter and deposition monitor to provide a control loop at each deposition station. Although four stations have been illustrated, more or less can also be provided.

The space "S" between the drum surface 72 and the shell 81 is varied to control the impact of the secondary electrons on the substrate to maximize the decoupling of the magnetron confined plasma from the substrates to provide a more uniform and controlled deposition. The system 66 is operated under vacuum with a sputtering gas such as argon. In addition, a reactive gas, such as hydrogen or a compound containing hydrogen, can be injected into the plasma adjacent the target for the effects described above. The system can make many substantially identical modulated structures on the plurality of substrates 68 or can make a single structure on the cylinder 72.

The present invention includes the choice of the most appropriate materials which can take full advantage of the improved synthesis techniques above described in specific wavelength ranges of interest. It has been previously known that the reflectivity properties of 1 sm devices can be controlled by controlling the electron density as a function of depth in the 1 sm device. For example, to obtain the maximum reflectivity it is known that the constituents should be chosen with the maximum electron density differences between the layers. Hence the dominant choice in the prior art 1 sm devices has been W:C or W-Re:C layers.

Additional factors which are important in achieving the maximum control over the composition gradients in the structures of the parent application and the present invention are relative electronegativities, atomic diameters and bond lengths as described in the parent applications and incorporated herein by reference.

In accordance with the parent application, carbon and boron can be utilized as major constituents of the layered structures. The layers can be formed with a buffer layer as described in the parent application.

The higher electron density contrast of the carbon and boron including structures in the parent application provides an increase in reflectivity and resolution for specific X-ray wavelength ranges of interest, which generally are subranges of the total soft X-ray range of 9.75 to 120Å prescribed in its parent application. The prior art describes structures formed of layer pairs A and B of W:C and ReW:C. The parent application includes generally with but also without the buffer layer, structures formed of Hf:C, HfW:C, Re:C and HfRe:C and Hf:$B_4C$, W:$B_4C$, Re:$B_4C$, HfW:$B_4C$ HfRe:$B_4C$ and HfWRe:$B_4C$. The present invention also includes structures including carbon and boron for the limited ranges set forth below.

According to the present invention, it now has been discovered that structures including carbon, specifically Cr:C, Ni:C and V:C, can be constructed to provide improved characteristics for carbon analysis. The structures were analyzed both in a flat configuration as shown in Table 1 and a curved configuration as shown in Table 2. The comparisons for C $K\alpha$ reflections are shown in both tables.

TABLE 1

| | (Flat Structures) | | | | |
|---|---|---|---|---|---|
| Structure Number | Composition | Layer Pairs | d (Å) | Peak (cps) | p/b | dE/E |
| XRO1013.07 | W:C | 125 | 39.7 | 305 | 31 | 4.74 |
| XRO797.01 | W:C | 75 | 58.0 | 530 | 26 | 7.67 |
| XRO657.06 | W:C | 75 | 80.3 | 790 | 24 | 12.14 |
| XRO1227.10 | V:C | 200 | 68.6 | 1075 | 102 | 7.12 |
| XRO1227.06 | V:C | 200 | 51.4 | 630 | 143 | 4.9 |
| XRO1227.07 | V:C | 200 | 40.2 | 318 | 115 | 3.5 |
| XRO1227.02 | V:C | 200 | 72.2 | 670 | 106 | 6.4 |
| XRO1190.07 | V:C | 200 | 65.0 | 820 | 112 | 6.5 |
| XRO1228.05 | V:C | 200 | 95.3 | 1400 | 40 | 11.3 |
| XRO1119 | V:C | 50 | 49.0 | 470 | 156 | 4.65 |
| XRO1183 | Cr:C | 50 | 44.9 | 640 | 103 | 4.28 |
| XRO1184 | Cr:C | 50 | 42.1 | 405 | 169 | 4.36 |
| XRO1188 | Ni:C | 50 | 39.9 | 520 | 173 | 3.96 |
| XRO1186 | Ni:C | 50 | 42.1 | 670 | 129 | 3.27 |

The W:C structures are Applicants own prior structures, which have been commercially utilized. These structures were formed by planar magnetron or ion beam assisted deposition techniques as described above. The measurements were made in a Philips four position wavelength dispersive spectrometer under substantially identical operating conditions for each test. For these results the peak to background ratio (p/b) was measured and not the net peak to background (p-b/b), however the p-b/b can be calculated from the above table if desired. For the carbon analysis, generally in a wavelength range of 40 to 70 Angstroms, and more specifically at 44.7 Angstroms, the V:C, Ni:C and Cr:C structures substantially out-perform the prior art structures.

In reviewing the test results in Table 1 and those that follow, the following should be noted. A number of the structures were deposited with a less than an optimum number of layer pairs, less than one hundred, for test purposes. In general, Applicants have discovered that the peak intensity and p/b increase and the bandwidth (dE/E) decreases with an increase in the number of layer pairs. The W:C structures are representative of Applicants' own prior structures. The test results of over 380 of these structures were reviewed to select the representative structures. The ratio of metal to non-metal in the layer pairs or sets ranged from 1 to 1 to 1 to 3. The improved structures have improved overall characteristics over the prior art for peak p/b and dE/E in the range of d spacing of 35 to 80 Angstroms.

TABLE 2

| | (Curved Structures) | | | | | |
|---|---|---|---|---|---|---|
| Structure Number | Composition | Layer Pairs | d (Å) | Peak (cps) | (p-b)/b | dE/E | lld |
| Lead Myristate | | | 40 | 33300 | 180.1 | 3.00 | 0.01243 |
| XRO1119 | V:C | 50 | 49.0 | 184891 | 93.9 | 4.49 | 0.00728 |

TABLE 2-continued (Curved Structures)

| Structure Number | Composition | Layer Pairs | d (Å) | Peak (cps) | (p-b)/b | dE/E | lld |
|---|---|---|---|---|---|---|---|
| XRO1184 | Cr:C | 50 | 42.1 | 201679 | 137.3 | 4.36 | 0.00574 |
| XRO1188 | Ni:C | 50 | 39.9 | 188593 | 126.4 | 4.54 | 0.00619 |

These measurements were made in a JEOL WDS (FCS-35) Spectrometer by standard techniques under substantially identical operating conditions for each test. In the curved (microprobe) structures, W:C has not been the selected prior art since the peak is better, but both bandwidth and p-b/b are worse. In these results, another factor has been analyzed, the lower limit of detection (lld) is expressed as a percent, which is a measure of sensitivity and throughput in a test environment. The lld are each divided by the square root of the same measurement time t (in the example t is chosen as 100 seconds), so the Cr:C (XRO1184) and Ni:C (XRO1188) structures can be seen as having more than twice the measured sensitivity than the Myristate prior art. The three curved structures all were also tested in the flat configuration, to provide a comparison between the two structures. With an increase in layer pairs, the (p-b)/b should increase while the dE/E should decrease. Even with only 50 layer pairs, the peak intensity and lld are very substantially superior to the prior art structures.

It also has been discovered, according to the present invention, that Mo:B$_4$C structures can be constructed to provide improved characteristics for boon and beryllium analysis. Table 3 shows the flat structure results and Table 4 shows the curved structure results for B Kα analysis.

TABLE 3

(Flat Structures)

| Structure Number | Composition | Layer Pairs | d (Å) | Peak (cps) | p/b | dE/E |
|---|---|---|---|---|---|---|
| XRO1186 | Ni:Cr | 52 | 41.4 | 41 | 21.6 | 4.10 |
| XRO1202 | Mo:B$_4$C | 30 | 74.5 | 98 | 26.4 | 5.88 |
| XRO1203 | Mo:B$_4$C | 30 | 79.6 | 115 | 32.9 | 6.26 |
| XRO1205 | Mo:B$_4$C | 26 | 79.4 | 115 | 28.1 | 6.00 |

These measurements were made in the same manner as those in Table 1. These structures provide a new analysis, since for the flat structures analysis, no prior art structures commercially exist. The Ni:C structure (XRO1186) is a structure which can be utilized for both boron and carbon analysis (Table 1).

TABLE 4

(Curved Structures)

| Structure Number | Composition | Layer Pairs | d (Å) | Peak (cps) | (p-b)/b | dE/E | lld |
|---|---|---|---|---|---|---|---|
| | Lead Myristate | | 40.0 | 16000 | 316.9 | 2.46 | 0.01336 |
| XRO1188 | Ni:Cr | 50 | 39.9 | 38762 | 148.4 | 3.85 | 0.01259 |

TABLE 4-continued (Curved Structures)

| Structure Number | Composition | Layer Pairs | d (Å) | Peak (cps) | (p-b)/b | dE/E | lld |
|---|---|---|---|---|---|---|---|
| XRO1224 | Mo:B$_4$C | 50 | 67.0 | 226646 | 111.3 | 5.30 | 0.00603 |

These measurements were made in the same manner as those in Table 2. The Ni:C (XRO1188) is a structure which can be utilized for both boron and carbon analysis (see Table 2). The Mo:B$_4$C shows a huge increase in peak and less than half the lld over the prior art Myristate crystal.

Table 5 shows the curved structure results for Be Kα analysis, since it is not believed that flat structure analysis of beryllium provides useful results.

TABLE 5

(Curved Structures)

| Structure Number | Composition | Layer Pairs | d (Å) | Peak (cps) | (p-b)/b | dE/E | lld |
|---|---|---|---|---|---|---|---|
| | Lead Cerotate | | 68.5 | 971 | 90.3 | 4.20 | 0.1024 |
| XRO1097.05 | W:C | 50 | 79.6 | 4577 | 9.2 | 6.50 | 0.16 |
| XRO1205 | Mo:B$_4$C | 50 | 79.4 | 26382 | 63 | 5.70 | 0.0235 |

These measurements were made in the same manner as those in Table 2. The lead Cerotate has good (p-b)/b, but poor peak intensity. The Mo:B$_4$C structures of the invention have reasonable (p-b)/b and dE/E, but excellent peak intensities and lld. Applicants believe that a Mo:B$_4$C structure with a d spacing of about 139 Angstroms or greater would provide a structure for use in boron and beryllium analysis. The W:C is not a commercial prior art structure, but is an example of the results obtainable for that composition. The Mo:B$_4$C structures can have a range of d spacing of 35 to 200 Å, preferably 40–100Å for use in the boron and beryllium analysis, generally a range of 55 to 130 Å and more specifically at 67.6 and 114 Å, respectively.

Many modifications and variations of the present invention are possible in light of the above teachings. Although sputtering targets are more easily formed of the compound B$_4$C, essentially pure boron targets could be utilized to form boron layered structures. The layer pairs can also include layer sets with other layers formed therebetween. The ion beam or sputtering flux can be profiled to control the uniformity of the deposited structure over the substrate area. This allows the construction of structures whose d spacing can be varied in a controlled fashion across the surface of the substrate and subsequent layers. The type of substrate is not critical and can include any prior 1 sm type of substrate, including polished silicon wafers, glass, metal, quartz, sapphire or flexible plastic. It is, therefore, to be understood that within the scope of the appended claims, the invention may be practiced otherwise than as specifically described.

What is claimed and desired to be secured by Letters Patent of the United States is:

1. In a method for the wavelength dispersive spectroscopic analysis for a light metal chosen from the group consisting of beryllium and boron, comprising the steps of:
   providing a sample;
   direction a beam of X-rays at said sample, to cause the sample to emit fluorescent radiation X-rays;

directing said emitted X-rays onto an X-ray dispersive structure and reflecting said X-rays from said X-ray dispersive structure to a detector; and detecting said reflected X-rays to perform the analysis;

the improvement wherein said X-ray dispersive structure includes a plurality of layer pairs formed on one another, one layer of said layer pair being formed of $B_4C$, the other layer of said layer pair being formed of vacuum deposited molybdenum, and said layer pairs having a d spacing of 35 to 200 Angstrom, whereby said layer pairs have X-ray dispersive properties over a predetermined first wavelength range of interest, and a maximum net peak to background ratio at a narrow second wavelength range of 55 to 130 Angstroms within said predetermined wavelength range of interest for the detection of beryllium and boron.

2. In a method for the spectroscopic analysis for carbon comprising the steps of:

providing a sample;

directing a beam of X-rays at said sample, to cause the sample to emit fluorescent radiation X-rays;

directing said emitted X-rays onto an X-ray dispersive structure and reflecting said X-rays from the X-ray dispersive structure to a detector;

the improvement wherein said X-ray dispersive structure comprises a plurality of layer pairs formed on one another, one layer of said layer pair being formed of carbon, and the other layer of said layer pairs being formed of a vacuum deposited transition metal chosen from the group consisting of nickel and vanadium, said layer pairs having a d spacing of 35 to 80 Angstroms, said layer pairs having X-ray dispersive properties over a predetermined first wavelength range of interest and a maximum net peak to background ratio at a narrow second wavelength range of 40 to 50 Angstroms within said predetermined wavelength range of interest for the detection of carbon.

* * * * *